United States Patent [19]
Asthana et al.

[11] Patent Number: 6,029,224
[45] Date of Patent: *Feb. 22, 2000

[54] SELF-CONTAINED MEMORY APPARATUS HAVING DIVERSE TYPES OF MEMORY AND DISTRIBUTED CONTROL

[75] Inventors: Abhaya Asthana, Berkeley Heights; Douglas E. Haggan, Bridgewater; King Lien Tai, Berkeley Heights, all of N.J.

[73] Assignee: Lucent Technologies Inc., Murray Hill, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 08/477,175

[22] Filed: Jun. 7, 1995

[51] Int. Cl.[7] .......................... G06F 13/368; G06F 12/08; G06F 13/16

[52] U.S. Cl. ............................. 711/5; 711/170; 710/119; 710/120

[58] Field of Search ...................... 395/427; 364/DIG. 1; 711/170, 119, 128, 122, 207, 148, 167, 2, 5; 709/219; 710/8, 74, 120, 119

[56] References Cited

U.S. PATENT DOCUMENTS

| | | | |
|---|---|---|---|
| 5,077,537 | 12/1991 | Leger et al. | 714/6 |
| 5,226,133 | 7/1993 | Taylor et al. | 711/207 |
| 5,442,771 | 8/1995 | Filepp et al. | 709/219 |
| 5,471,625 | 11/1995 | Mussemann et al. | 713/322 |
| 5,584,007 | 12/1996 | Ballard | 711/113 |
| 5,586,300 | 12/1996 | Wilcox et al. | 711/150 |

OTHER PUBLICATIONS

King L. Tai, et al. "A Chip–On–Chip DSP/SRAM Multichip Module" Apr. 1995 pp. 466–471.

Byung J. Han, et al. "A Silicon–on–Silicon MCM for Voice Recognition/Telephone Answering Device" Jan.–Feb. pp. 1–3.

Robert C. Frye, et al. "Trends in Silicon–on–Silicon Multichip Modules" Dec. 1993 pp. 8–17.

*Primary Examiner*—B. James Peikari

[57] ABSTRACT

An apparatus is provided that improves memory storage and access speed by repackaging various types of memories, SRAM, DRAM, and Disk, into a single storage unit. Each unit contains a slice of all the various memories along with programmable logic to control the accessing of the memories. This unit appears to the central processing unit (CPU) of a computer system as an extremely large secondary cache. Independent management of each unit greatly reduces bus traffic to implement any particular address space. By using a plurality of these memory units, an extremely large amount of memory can be accessed by the CPU with the speed of accessing a cache system.

20 Claims, 6 Drawing Sheets

SELF-CONTAINED MEMORY APPARATUS HAVING DIVERSE TYPES OF MEMORY AND DISTRIBUTED CONTROL

BACKGROUND OF THE INVENTION

1. Field of the Invention

This invention relates generally to computer processor memory storage systems and more particularly to self managing memory systems that vertically slice the storage hierarchy for increased virtual memory giving the appearance of an extended secondary cache to the processor.

2. Description of the Related Art

As processors continue to get faster, memory continues to get more dense and its speed continues to lag that of the processor. This gap between processor and memory access speed has given rise to hierarchical memory architectures that attempt to smooth the technological discontinuities. Current processor strategy requires the central processing unit (CPU) to have on-chip primary cache memory with a secondary cache located in close proximity. Both primary and secondary caches are normally static random access memory (SRAM) technology and must be leading-edge for best performance. From the processor's view, maximum performance with respect to memory operations is obtained when no memory "wait states" are caused due to information not being present in the cache. When information is not in the cache, it must be fetched from the next memory level. The actual penalty for a failure of the processor to find the desired information in the cache, or cache miss, will be a certain amount of time depending on the memory block size as well as memory latency and bandwidth.

Virtual memory allows the creation of the illusion of a large memory that can be accessed as fast as a small memory. The principle of locality governs the behavior of virtual memory systems. Locality is exhibited spatially, as well as temporally. Spatial locality arises due to the clustering effect of the executing program and data in memory. Items with addresses close to a referenced item are likely to be also referenced. Temporal locality arises due to the fact that when an item that is referenced once, it is likely to be referenced soon again.

The benefits of virtual memory are efficient sharing of memory between multiple programs, the ability to exceed the size of the primary memory while making data movement between small physical memory and large secondary memory transparent to the user and the ability to dynamically relocate program address space.

While the transfers between cache and main memory are handled mostly in hardware, transfers between disks and main memory are typically managed by the operating system in the CPU. The disk subsystem, memory bus and I/O control are shared by the main memory subsystem to implement a typical virtual memory. Similarly, the same main memory is shared by the cache over the main memory bus to implement the next level of hierarchy. This sharing of resources over a limited bandwidth bus causes severe performance bottlenecks.

The ability to package systems that interconnect logic and memory is known in the art. This is typically done via multichip module technology as described in King L. Tai, et al., "A Chip-On-Chip DSP/SRAM Multichip Module", Proceedings International Conference on Multichip Modules, Denver, Colo., Apr. 19–21 (1995). Silicon-on silicon multichip modules allow for the micro-integration of various memories on a single module with the additional logic for control.

SUMMARY OF THE INVENTION

In accordance with the principles of the invention, the self-managing memory system integrates Static Random Access Memory (SRAM), Dynamic Random Access Memory (DRAM), disk and on-line programmable control logic in a small compact storage unit. This unit appears to the CPU as an extremely large secondary cache. High performance and efficiency are obtained by combining a slice of all the hardware and software elements required to implement the memory hierarchy in a computer system, from secondary cache to virtual memory, into a single storage unit, i.e. a single printed circuit board.

The virtual address space is now subdivided into smaller, independent units. Each unit is self-managing and operates independently to implement its part of the address space. This strategy reduces the bus traffic, automatically controls resources and eliminates the operating system bottlenecks of the prior art.

BRIEF DESCRIPTION OF THE DRAWINGS

So that one skilled in the art to which the subject invention appertains will better understand how to practice the present invention, preferred embodiments of the apparatus will be described in detail hereinbelow with reference to the drawings wherein.

DETAILED DESCRIPTION OF THE PREFERRED EMBODIMENTS

Figure 1A:
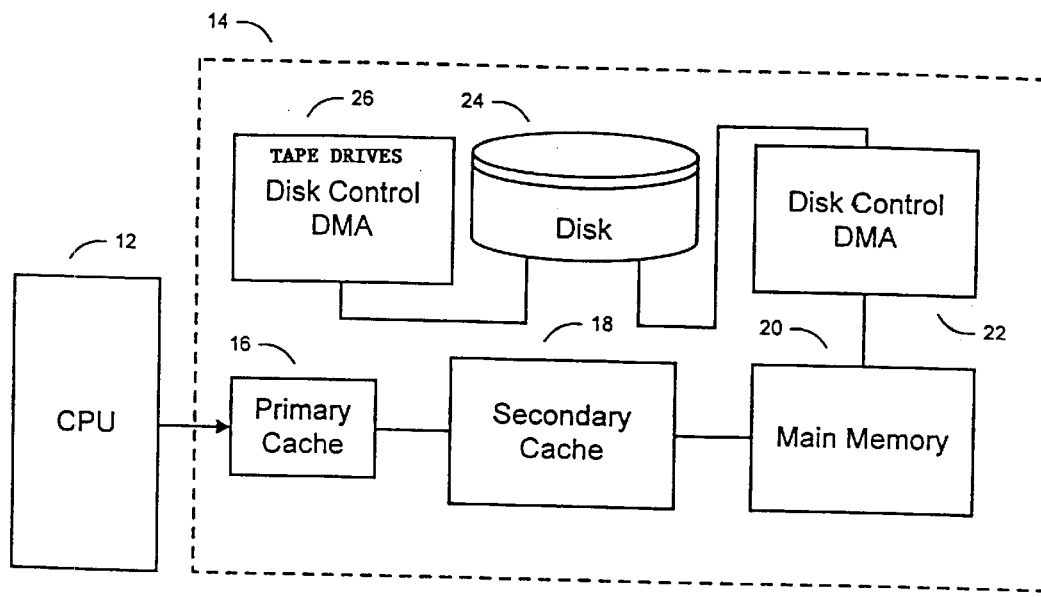
FIG. 1A is a block diagram showing a traditional memory hierarchy of the prior art.
Figure 1B:
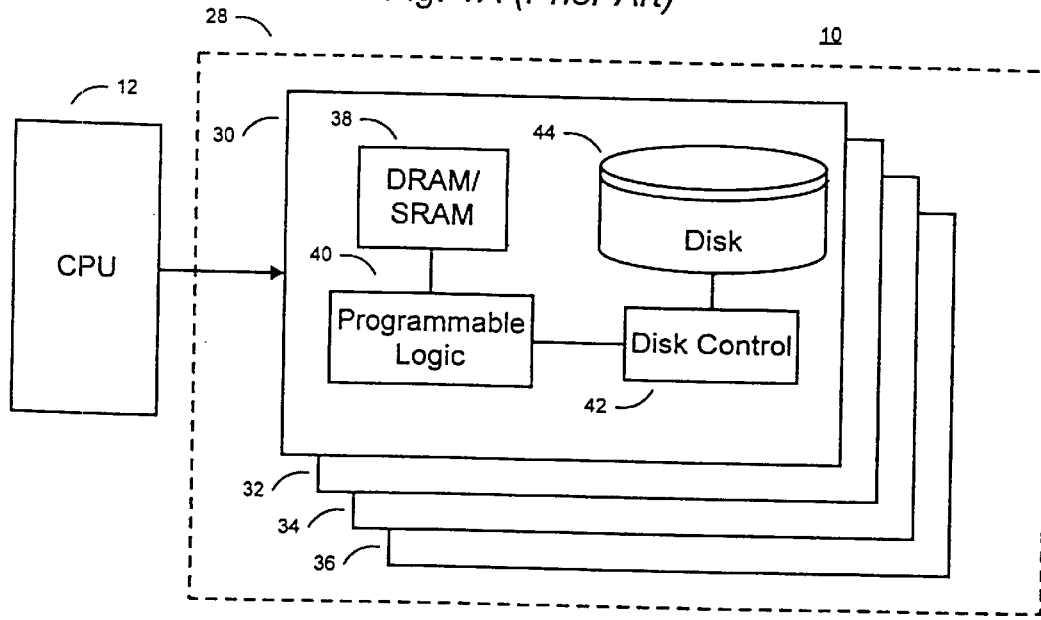
FIG. 1B is a diagram illustrating the present invention.

FIGS. 1A and 1B illustrate, in a simplified manner, how the self-managing memory system replaces the prior art. In FIG. 1A, the prior art shows block 14 as the traditional view of the memory hierarchy as a pipeline from the smallest and fastest type of memory being closest to the CPU 12 and the slower memories being progressively further away. The highest level elements closest to the CPU 12 are the primary cache 16 and secondary cache 18, along with the address translation and cache control logic. At the next lower level is the main memory 20 and its associated memory control logic. The next level is the disk subsystem 24 with the associated direct memory access (DMA), disk control 22 and disk drive units 24. Beyond the disk 24 is the archival storage consisting of tape drives 26. While the transfers between the cache and the main memory are handled mostly in hardware, the transfers between disk 24 and main memory 20 are entirely managed by the CPU 12 operating system over the I/O subsystem. The main memory 20 is normally treated as one monolithic physical memory whereas the disk 24 is treated as one large secondary, permanent storage. Both of these can be configured independently depending upon the application. Thus, the same disk subsystem, memory bus and I/O control is shared by the main memory 20 to implement virtual memory. Similarly, the same main memory 20 is shared by the primary cache 16 and secondary cache 18 over the main memory bus to implement the next level of hierarchy.

In order to eliminate the sharing of resources over a limited bandwidth bus, FIG. 1B shows the present invention directly replacing the prior art shown generally at 10. In this approach, the storage hierarchy is sliced into thin vertical slices. Thus, the virtual address space is subdivided into smaller, independent units 30, 32, 34 and 36, each being a single printed circuit board. Each unit or slice has its own cache and main memory (DRAM/SRAM 38), disk 44, disk control 42 and necessary programmable control logic 40. Each slice is therefore self-managing and operates independently to implement its part of the address space. The CPU 12 can have a slice from all or any one of these smaller address spaces.

Figure 2:
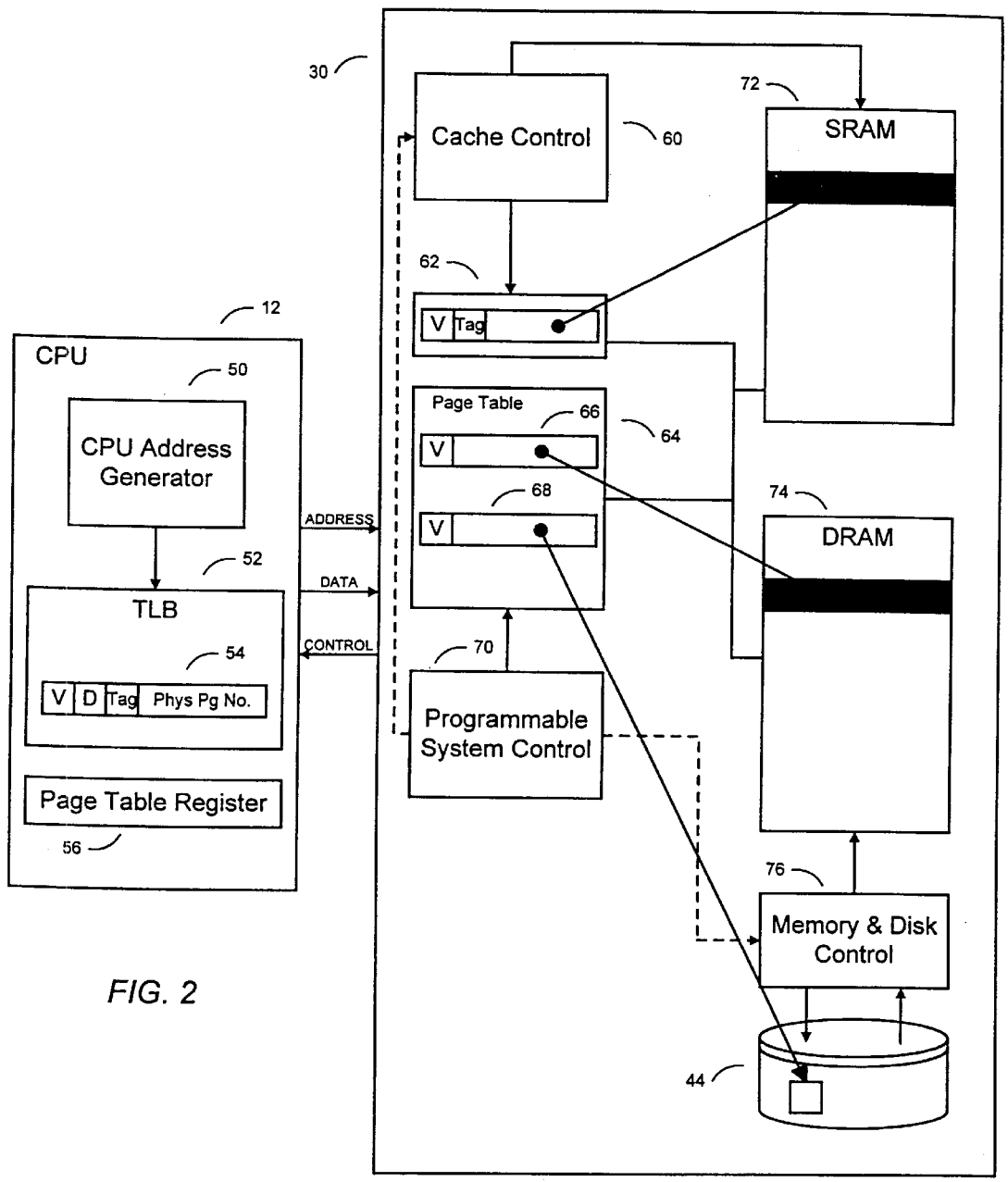
FIG. 2 is a block diagram illustrating portions of the present invention.

In its simplest mode, the present invention implements a large pseudo-virtual storage system as shown in FIG. 2. The system essentially acts as a block/page server. The requesting CPU 12 maintains a small Translation Lookaside Buffer (TLB). This TLB is used to speed up the translation process from virtual to physical page numbers. When a translation for a page is used once, because of both spatial and temporal locality within a page, it will most likely be used again in the near future.

The CPU address generator 50 requests a particular virtual memory address from its TLB 52. The TLB 52 scans its buffer locations 54 to determine if there is a hit or a miss, i.e., whether the address has already been translated. The memory system 30 maintains page tables 64 in a well known part of the physical memory that is not swapped out. The page table register 56 points to the page table. The memory system 30 also contains a SRAM 72 used for direct mapped cache. In case of a TLB hit, the address given to the memory system 30 is a physical address 62 that is used to get data directly from the cache. This is controlled via the programmable system control 70 to the cache control 60. If the proper data is not in the SRAM 72, it is obtained from the DRAM 74.

In the case of a TLB miss, the CPU 12 sends a virtual address with a get_pt_entry request to the memory system 30 that has a page table 64 for that process. The memory system 30 fielding that process checks the corresponding page table entry 66 and 68 to determine if the page is in main memory, and if so, the entry is returned to the CPU 12 as data. If the page table entry 68 indicates that the page is not in main memory, a "wait" message is returned to the CPU 12 by the memory and disk control 76, since data has to be read from the disk 44. At this point the CPU may decide to switch to another task. The programmable system control 70 instructs the memory and disk control 76 to read from the disk 44, updates the page table entry 68 and sends an "access done" message to the CPU 12. The CPU 12 can then update the TLB location 54 and resume the paused process. The programmable system control 70 handles all the page fault handling, management of the page table 64, cache control 60 and disk control 76. This immediate read/write control of the disk control 76 allows the system to perform a high level of power management of the memory resources. The disk control 76 will only start the disk 44 when needed and be able to keep the start-up time as transparent as possible to the application.

Figure 3:
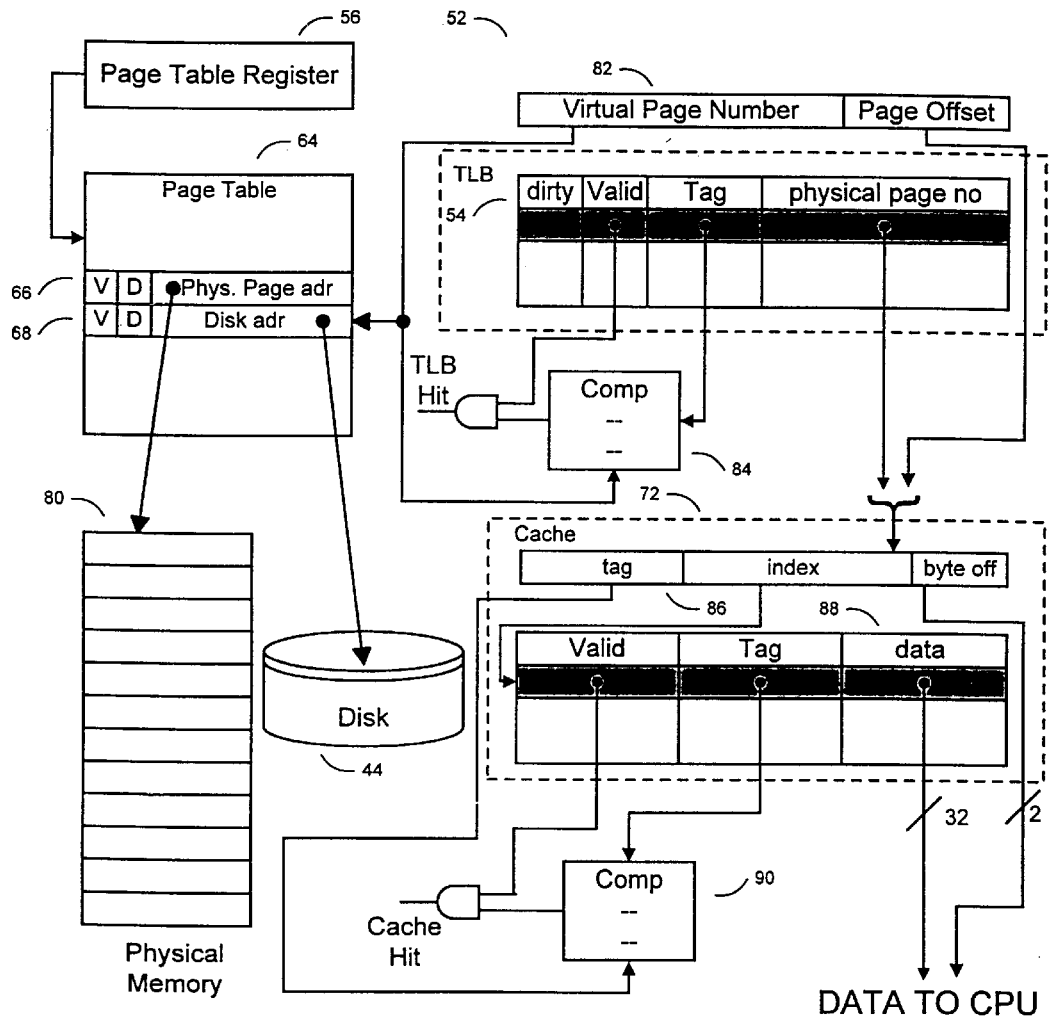
FIG. 3 is a block diagram illustrating method of address translation used in the present invention.

Virtual memory address 82 consists of a virtual page number and an offset as shown in FIG. 3. The virtual page number is translated into a physical page number 54 using a page table 64 and a TLB 52. The page table 64 provides a complete mapping for all the virtual pages in a program's address space to physical pages in the primary physical memory 66, 80 or to a page in the disk memory 68, 44. Typical page sizes are 4 KBytes to 16 KBytes.

The mapping in the page table 64 from virtual to physical is fully associative. Each program that is run has its own page table 64 and page table register 56 that points to the current page table 54 in use. A valid bit in the page table entry 66 indicates that the page is in primary memory. If the bit is off for a referenced page, a page fault occurs. If the bit is on, the entry contains the physical page number. No tags are required since there is an entry for every virtual page. For example, 1M page table entries and a 4 KB page size would be required for a total of 4 GBytes virtual space for each process to handle a 20 bit virtual paged number and a 12 bit offset. The page table, program counter, register and page register specify the program state and therefore must be saved upon a context switch to a different process.

When a physical address 54 is presented to the memory system of the present invention, the lower portion of the address is used to select an entry from the cache table 88. These entries consist of a tag, a valid bit and a data word. The tag is compared in the comparator 90 to the upper portion of the physical address to determine whether the entry in the cache corresponds to the requested address. If there is a match (i.e. a cache hit) and the valid bit is on, the data word is returned to the CPU. Otherwise, there is a cache miss, and the data is read from DRAM. The data is written into the cache data word 88, the upper bits of the address is written into the tag field and the valid bit is turned on. Using a write through process, on a write miss, the data is also written into the main memory using the full address.

By using a wide memory word, the cache miss penalty is kept to only one memory access time. Further, the data word block size can be several words wide. This reduces the cache miss rate due to the spatial locality and increases the efficiency with respect to the ratio of tag bits to data bits.

The placement of a data word block with a direct mapped cache is straightforward. The block can only go in one place. As an alternative embodiment, the present invention would use an N-way set associative cache. In this scheme, there are a fixed number of locations, N, where the block can be placed. Each block in memory maps to a unique set given by the index field of the physical address 86, and the block can be placed in any element of the set. A full search is done within a set to find a block.

Each block includes an address tag that gives the block address. The index field from the referenced address is used to select the set containing the address of interest. The tags of all the blocks in the set are compared against the referenced tag field in the cache 72 at comparator 90 to find the exact block within the set. Which block that gets replaced upon a miss is decided using a random sequence.

As the cache 72 size becomes larger, the incremental benefit gained from the degree of associativity becomes smaller. An added disadvantage of increasing associativity is slower access times due to searches and higher costs. Thus, in the memory system of the present invention, direct mapped cache with a wide data word is preferably used.

Figure 4:
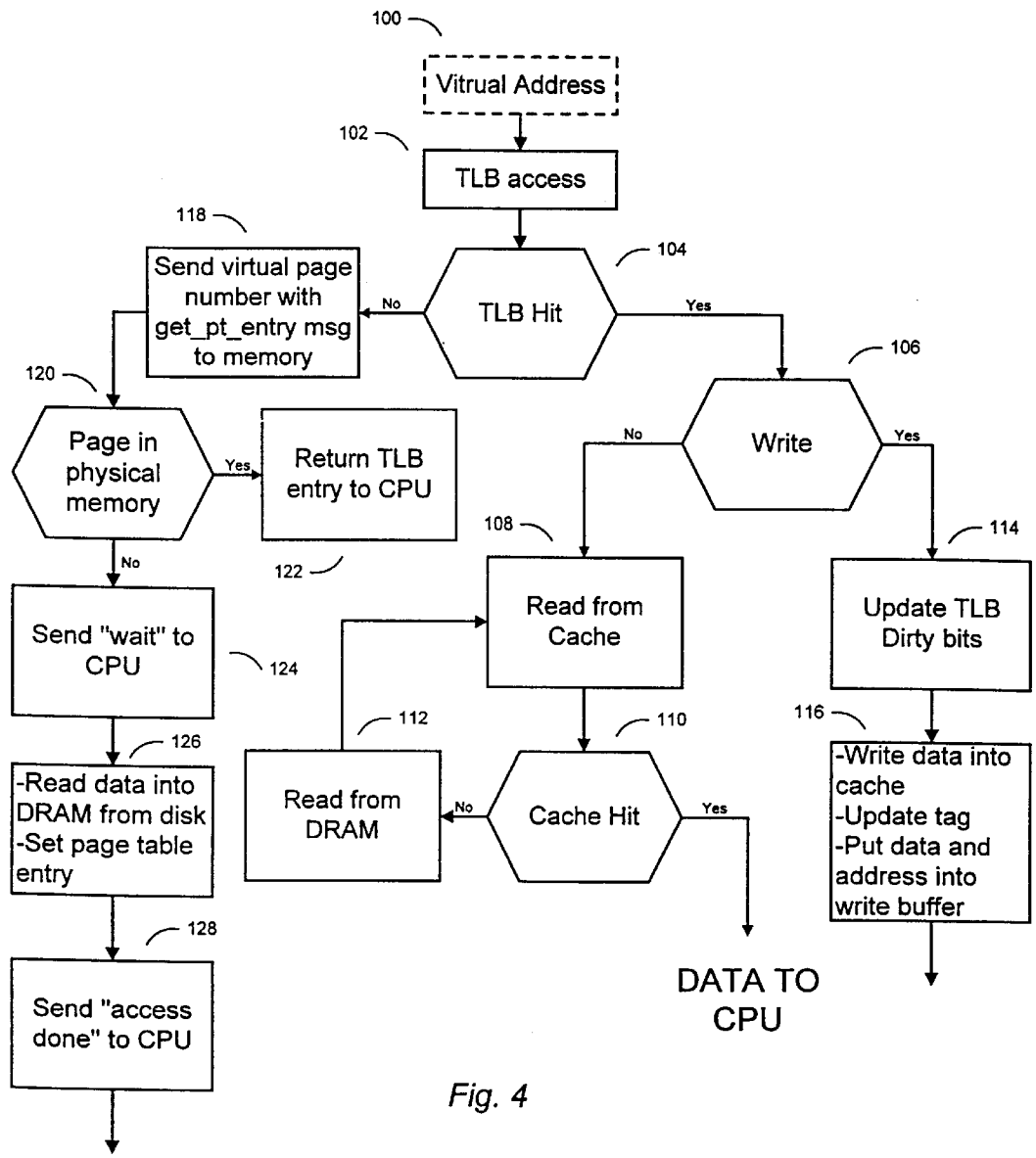
FIG. 4 is a flow diagram for completing an address translation and cache access of the present invention.

In the preferred embodiment of the present invention, the scenario for completing an address translation between the CPU and the memory system is depicted in the flow chart of FIG. 4. The virtual address 100 must first go through a TLB access 102 in order to form a physical address that is used to access the cache. These accesses can be pipelined to increase the speed and efficiency.

The TLB only holds page table mappings. Each tag in the TLB holds a virtual page number. The TLB also needs to include reference and dirty bits as shown in FIG. 3. The virtual address is used to look up the virtual page number in the TLB. If it is there, i.e. a TLB hit (104), the physical page number is used to access the physical memory and the reference bit is turned on. When writing into the cache (106), the TLB dirty bits are updated (114) signifying that the cache is about to be altered and then the data is written into the cache and sent out to the physical memory (116).

In order to read from memory, the data is read from the location in cache (108). If the correct data is not there, i.e. a cache miss (110), the data is read from the DRAM (112) into the cache. The cache is then read again (108) and a cache hit occurs (110). This is now the correct data and is sent to the CPU.

When a TLB hit does not occur, i.e. a TLB miss (104), a distinction must be made between a page fault and a true TLB miss. TLB misses will be more frequent as there are normally fewer TLB entries than there are pages in the physical memory. A TLB miss means that either the page is in main memory and only an entry has to be created, or the page is not present in memory and must be read from the disk. Handling a TLB miss requires participation of both the CPU and the memory storage system. The CPU typically uses an exception mechanism to interrupt the current process, give control to the operating system and then, upon completion of the exception task, resume the execution of the interrupted process. When processing the TLB miss, the CPU presents the virtual address to the memory storage system with the get_pt_entry transaction (118).

The storage memory system tests the valid bit in the page table to determine whether the page is in physical memory (120). If the bit is on, the page table number is used from the get_pt_entry message to create a TLB entry back to the CPU (122). Otherwise, a page fault has occurred.

In a page fault case, the memory system must now look up the page table using the virtual address to find the location of the referenced page on the disk and choose a physical page to replace. It informs the CPU via a return "wait" message (124) that the miss is in fact a page fault and will require a disk access. If the physical page is dirty, i.e. the memory has already been modified, it must be written out to disk first. Then the memory system starts a read for the referenced page from the disk (126) into the chosen physical page.

In processing the page fault, the present invention must decide where to put the page it reads from disk in main memory. This is done using a Least Recently Used (LRU) scheme. A reference bit is added to the page table entry. When this page gets accessed, the reference bit gets set. The memory system periodically checks and clears these bits, maintaining a count of the bits set, i.e. pages being used. The pages with the low counts would then be subject to the disk reads.

Writes to memory are handled using a copy back scheme. Individual writes to a page are accumulated until the page is to be replaced. It is then copied back to the disk. This maintains maximum efficiency by requiring a single disk transfer as opposed to multiple transfers for each individual write. As a further enhancement, the use of a dirty or used bit, keeps track of whether a page really needs to be written out before it is to be replaced. If the dirty bit is clean then the page does not need to be written out since it was never modified. The dirty bit is set only if a page is written into since the last time it was read. Write operations use an extension of the write buffer concept to reduce the number of disk writes. Once the CPU receives the "wait" its operating system selects another process to run until the system is notified that the disk access is complete (128). During these "wait" and "access done" periods, the entire state of the current process is saved and then restored by the operating system.

Figure 5:
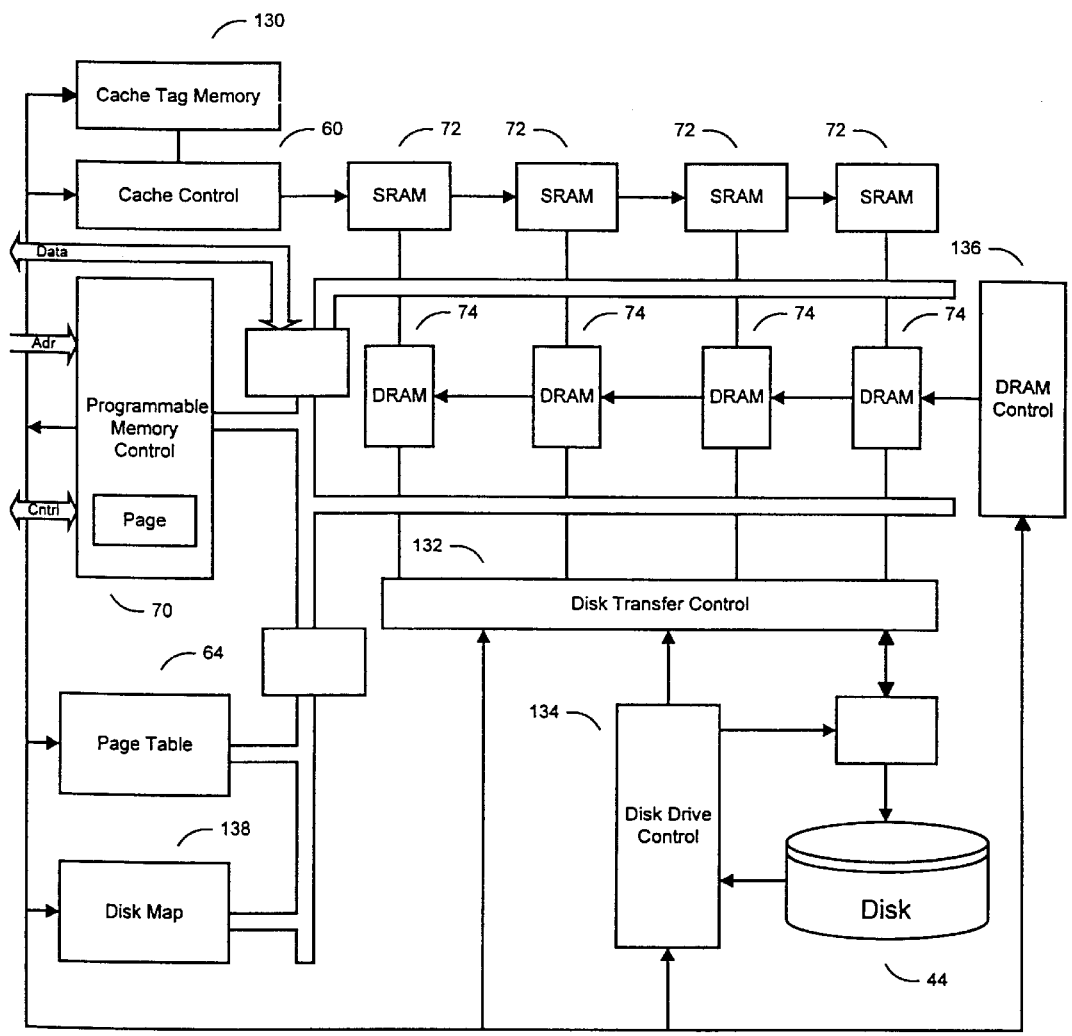
FIG. 5 illustrates an internal organization in accordance with the present invention.

The memory storage system of the present invention uses a wide-word, parallel, and pipelined architecture in its implementation. FIG. 5 shows the internal structure of the preferred embodiment. The high speed, static memory arrays 72 are used for data cache, cache tags 130, page table entries 64, and the disk map 138 through the cache control 60. The DRAMS 74 are used for storing the physical pages from the disk 44 via the disk transfer control 132 and disk drive control 134. The DRAM control 136 insures correct sequence of this process. The programmable memory storage control 70 of the present invention contains a data path and a control path to execute and control the various other controllers required for address translation, disk transfers and signaling with the CPU.

The programmed operations are imbedded in the programmable memory storage control 70 and are executed upon power on. During run time, new or advanced memory management operations can be downloaded into the control 70. This re-programmable nature allows the present invention to adapt to changing application characteristics and demands. The user of a computer system with the present invention has the ability to tune the memory (e.g. increase or decrease various buffer sizes) to allow for changes in the system as it grows or adds and deletes tasks.

As an enhancement to the preferred embodiment, multiple memory systems are present in a processing system creating memory modules. This provides higher performance by interleaving virtual pages across the modules. The page table is partitioned into contiguous, but self-contained parts. Each part is assigned to a module that handles all references to that portion of the page table.

Figure 6A:
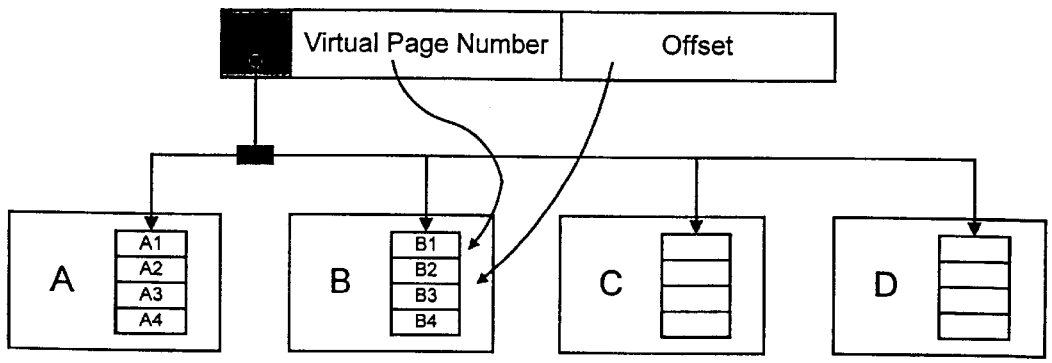
FIG. 6A shows a high order interleaving of the virtual page number of the present invention.

High order interleaving is depicted in FIG. 6A. In this arrangement, the high order kBits of the virtual page number are decoded to determine which module contains the requested portion of the page table. Each portion consists of a fully associative map of contiguous physical pages.

Figure 6B:
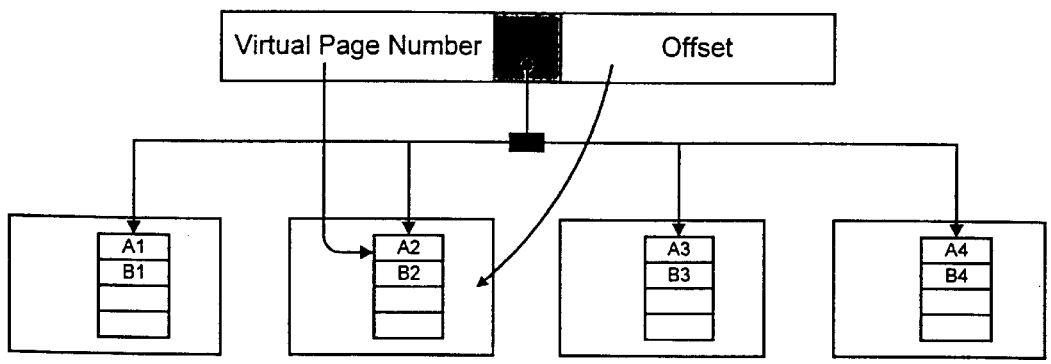
FIG. 6B shows a low order interleaving of the virtual page number of the present invention.

In contrast, FIG. 6B shows a low order interleaving configuration. Now the low order kBits from the virtual page number are used to determine the module that contains the referenced page. Contiguous physical pages are thus spread across modules instead of all in one. Other mappings are possible. A multi-threaded program can have its various threads and their associated text, data and stack segments allocated to various modules with a home page table that provides a first level index.

Although the subject invention has been described with respect to preferred embodiments, it will be readily apparent to those having ordinary skill in the art to which it appertains that changes and modifications may be made thereto without departing from the spirit or scope of the subject invention as defined by the appended claims.

What is claimed is:

1. A self-contained memory apparatus configured to be interfaced with at least one processing unit of a data processing system for increasing data storage capacity of said data processing system, said at least one processing unit being external to said apparatus, said apparatus comprising:

a plurality of self-managing memory units packaged within a single storage unit, each of said plurality of self-managing memory units capable of being coupled to said at least one processing unit when said apparatus is interfaced with said at least one processing unit for transmitting data and control signals between said at least one processing unit and said apparatus, each of said plurality of self-managing memory units comprising:

(i) a plurality of memory elements, each of said plurality of memory elements including at least one of a primary storage area, a secondary storage area, and a bulk storage area;

(ii) a control means operatively associated with at least one interface for integrally connecting said plurality of memory elements to said at least one processing unit, said control means controlling the sequencing of specific memory contents of said memory elements to said processing unit by controlling a plurality of other control means operatively associated with said plurality of memory elements to control self-managing of said plurality of memory elements, such that each one of the plurality of other control means controls only units of a given type and all units of said given type; and (iii) a bus network interlinking said control means with said other control means form transmitting data between said plurality of memory elements within said self-contained memory apparatus and between said plurality of memory elements and said processing unit;

wherein said control means enables said at least one processing unit to access at least one of said plurality of memory units as a cache memory, and wherein each memory unit operates independently under the control of said control means.

2. The apparatus of claim 1 wherein said primary storage area is at least one SRAM module.

3. The apparatus of claim 1 wherein said secondary storage area is at least one DRAM module.

4. The apparatus of claim 1 wherein said bulk storage area is a disk storage device.

5. The apparatus of claim 1 wherein said at least one processing unit uses a translation lookaside buffer for determining the type of address to send to said control means.

6. The apparatus of claim 5 wherein said address sent is a physical address.

7. The apparatus of claim 5 wherein said address sent is a virtual address.

8. The apparatus of claim 5 wherein said translation lookaside buffer maintains a table of translations between physical address pages and virtual address pages of said memory unit.

9. The apparatus of claim 8, wherein said control means maintains a fully associative mapping in said page table such that each program that is run has its own page table and page table register that points to a current page table in use.

10. The apparatus according to claim 5, wherein:

said control means within each of said plurality of memory units having logic for controlling sequencing of specific memory contents of said memory elements to said processing unit using said translation lookaside buffer; and each of said plurality of memory units defining a portion of a total virtual address space of said apparatus, and wherein each memory unit operates independently under the control of said control means implementing its portion of the total address space.

11. The apparatus of claim 10 wherein said control means further comprises at least one page table including virtual page numbers and physical page numbers to said plurality of memory storage areas.

12. The apparatus of claim 11 wherein said at least one page table includes memory identification tag bits.

13. The apparatus of claim 11, further including a high order interleaving arrangement wherein high order kBits of a virtual page number are decoded to determine which memory unit contains a requested portion of a page table, each said portion comprising a fully associative map of contiguous physical pages.

14. The apparatus of claim 11, further including a low order interleaving configuration wherein low order kBits from a virtual page number are used to determine said memory unit that contains a referenced page, and contiguous physical pages are spread across said memory units.

15. The apparatus of claim 10, wherein said primary and secondary storage areas of each memory unit are disposed on a single printed circuit board associated with that memory unit.

16. The apparatus of claim 10, wherein said logic being able to download updated logic allowing adaptation during run time.

17. The apparatus of claim 10 wherein said bulk storage area is a disk storage device.

18. The apparatus of claim 1, wherein said control means is further operable to read a referenced page from said bulk storage area when a page fault occurs, and to transfer said page from said bulk storage area to a physical page in one of said primary and secondary storage areas.

19. The apparatus of claim 18, wherein said control means transfers said page from bulk storage area to a physical page using a least recently used method wherein a reference bit is added to a page table entry, the reference bit is set when the page from the bulk storage area is accessed, the control means periodically checks and clears the reference bits and maintains a count of the reference bits set, and only pages with low counts are subject to reads from said bulk storage area.

20. The apparatus of claim 1, wherein said control means handles writes to memory using a copy back method wherein individual writes to a page are accumulated until the page is to be replaced and the page is copied back to the bulk storage area, thereby requiring a single disk transfer for each individual write.

\* \* \* \* \*